United States Patent [19]

Whittle et al.

[11] 3,971,299

[45] July 27, 1976

[54] MANUFACTURE OF BAGS

[75] Inventors: Harry Reed Whittle, Wallingford; Michael John Lee, Didcot; Roy Causer, Wantage, all of England

[73] Assignee: United Kingdom Atomic Energy Authority, England

[22] Filed: Dec. 3, 1974

[21] Appl. No.: 529,056

[30] Foreign Application Priority Data

Oct. 3, 1974 United Kingdom............... 43027/74

[52] U.S. Cl. ............................ 93/33 H; 93/84 FF; 93/93 HT; 93/DIG. 1; 156/515
[51] Int. Cl.[2] ......................................... B31B 23/00
[58] Field of Search............ 93/33 H, 33 R, DIG. 1, 93/8 R, 13, 93 HT, 93 R, 84 FF; 156/272, 515, 583, 510

[56] References Cited

UNITED STATES PATENTS

| | | | |
|---|---|---|---|
| 3,004,881 | 10/1961 | van der Meulen | 93/8 R X |
| 3,087,040 | 4/1963 | van der Meulen | 156/515 |
| 3,790,744 | 2/1974 | Bowen | 156/272 X |
| 3,833,446 | 9/1974 | Class | 93/33 H X |
| 3,867,873 | 2/1975 | Simpson et al. | 93/33 H |

Primary Examiner—James F. Coan
Attorney, Agent, or Firm—Larson, Taylor and Hinds

[57] ABSTRACT

A machine for making bags out of thermoplastics material including a rotating drum having pockets, a feed station including means for feeding material into the pockets at a predetermined rate to form loops, the rate of feed being linked to the rotational speed of the drum by a feed-back control means to ensure that the loops are of a predetermined size. The loops are welded and cut by a laser to form bags.

21 Claims, 10 Drawing Figures

U.S. Patent  July 27, 1976  Sheet 1 of 4  3,971,299
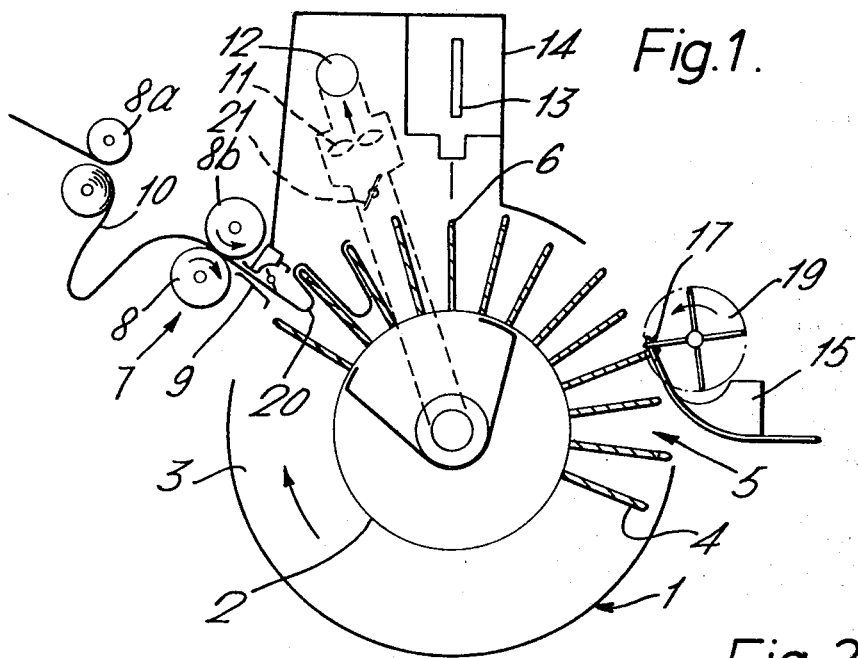
Fig.1.
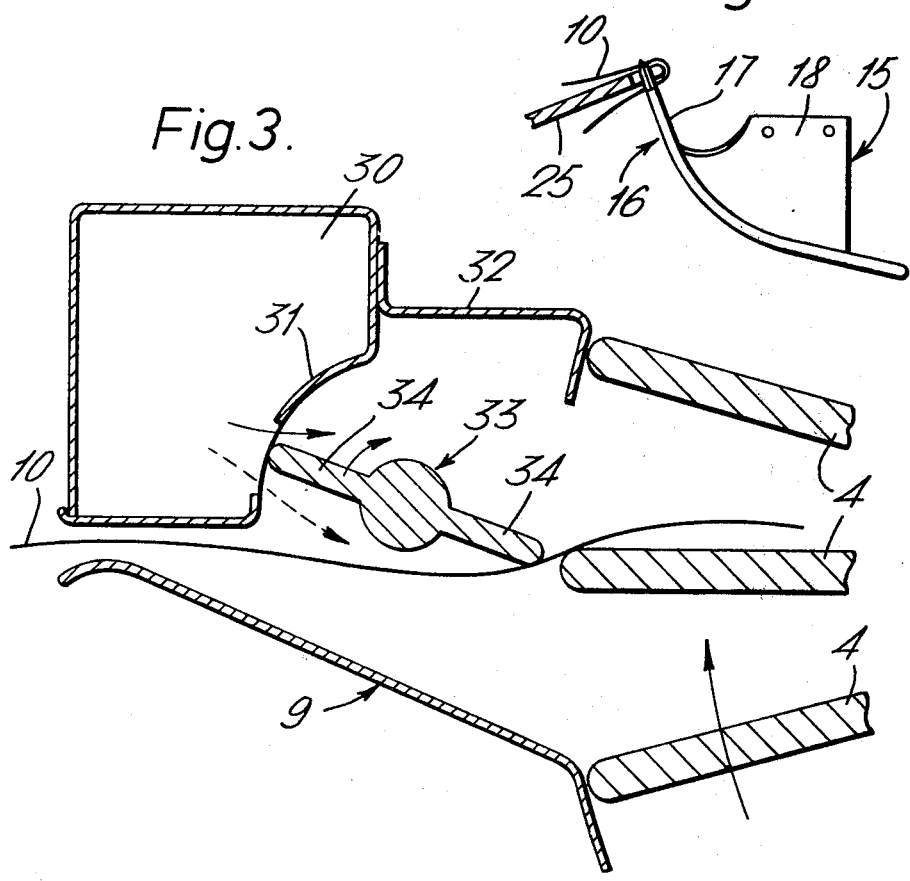
Fig.2.
Fig.3.

(a)

(b)

(c)

(d)

MANUFACTURE OF BAGS

The invention relates to the manufacture of plastic bags.

Existing machines for manufacturing bags from plastic materials employ jets of hot air or heated bars to weld the seams of the bags. Also, the material which is to be made into bags is presented to the bag shaping or welding device or devices in an intermittent manner. As a result, the production rates which can be achieved are limited.

According to the present invention there is provided a machine for manufacturing bags from a strip of plastics material comprising a carriage, a plurality of dividing members thereon to define a series of spatial intervals, means for moving the carriage so as to present each spatial interval first to a material feed station and then to a work station, wherein the feed station includes means for continuously feeding a strip of material to the carriage, a feed-back control means arranged to maintain a predetermined relationship between the rate of feed of the material and the speed of the carriage, and means for directing the strip of material into each spatial interval as it is presented to the feed station.

The means for directing the strip of material into each spatial interval may comprise a feed duct, a rotor positioned at the exit of the feed duct and arranged to bear on the strip of material and direct it around the outer edge of each advancing dividing member. The rotor may also act to cause a flow of air to assist the motion of the material into the carriage.

Alternatively the material may be directed into the spatial intervals by means of suitably directed air-jets.

In order to assist the formation and maintenance in the spatial intervals of loops of the material of constant length, there may also be provided means for exhausting air from the spatial intervals to generate a pressure difference across the strip of material such as to cause the strip of material to adhere to the dividing members and provide tension forces within the strip of material.

When the strip of material is in the form of a tube, the arrangement preferably is such that the operations of forming a welded seam and cutting the strip are carried out at alternate dividing members so that closed separate lengths of tubing are formed which are distributed symmetrically about the intermediate dividing members. The sealed lengths of tube are of a length such as to provide two bags when they are removed from the machine and subsequently divided.

The work station preferably includes a laser device, the beam energy cross-section of which is such that the sealing and cutting operations are performed simultaneously.

The dividing members may comprise plates mounted radially upon a drum so as to form pockets. Alternatively the dividing members may be plates or bars mounted on a carriage consisting of a turntable. Another form of carriage and dividing members is an endless belt having square or rectangular holes in it.

A suitable form of take-off device for the sealed and separated lengths of tube comprises a plurality of curved spikes which are arranged to pierce the lengths of tubing where they are folded over the intermediate dividing members. The outer regions of the intermediate dividing members have slots formed in them to allow the spikes to pass through them. The intermediate members are also arranged to be longer than those at which the strip of material is sealed and cut, so that the latter dividing members do not come into contact with the spikes. There may also be included a device, such as a pusher bar or a rotating paddle, for assisting the passage of the length of tubing down the spikes after the spikes have pierced the sealed length of tubing.

An embodiment of the invention will now be described, by way of example, with reference to the accompanying drawings, in which:

FIG. 1 is a diagrammatic representation of an embodiment of the invention.

FIG. 2 is a view of a take-off device incorporated in the embodiment of the device shown in FIG. 1.

FIG. 3 illustrates in more detail a material feed device incorporated in the embodiment of the invention shown in FIG. 1.

FIGS. 4a to d illustrates the action of the component shown in FIG. 3.

Figure 5:
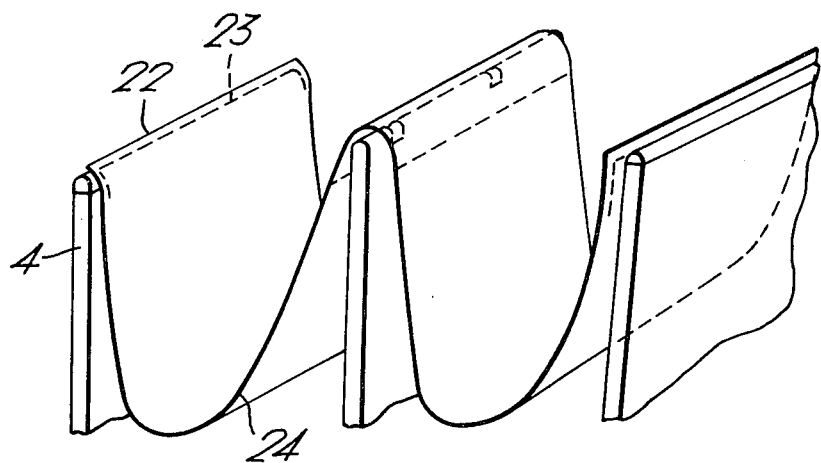
Figure 6:
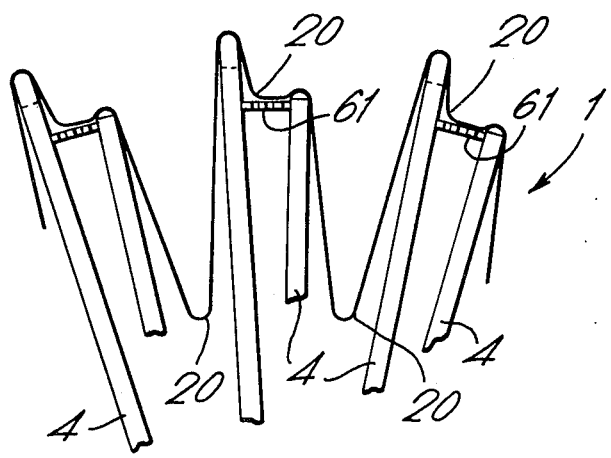
Figure 7:
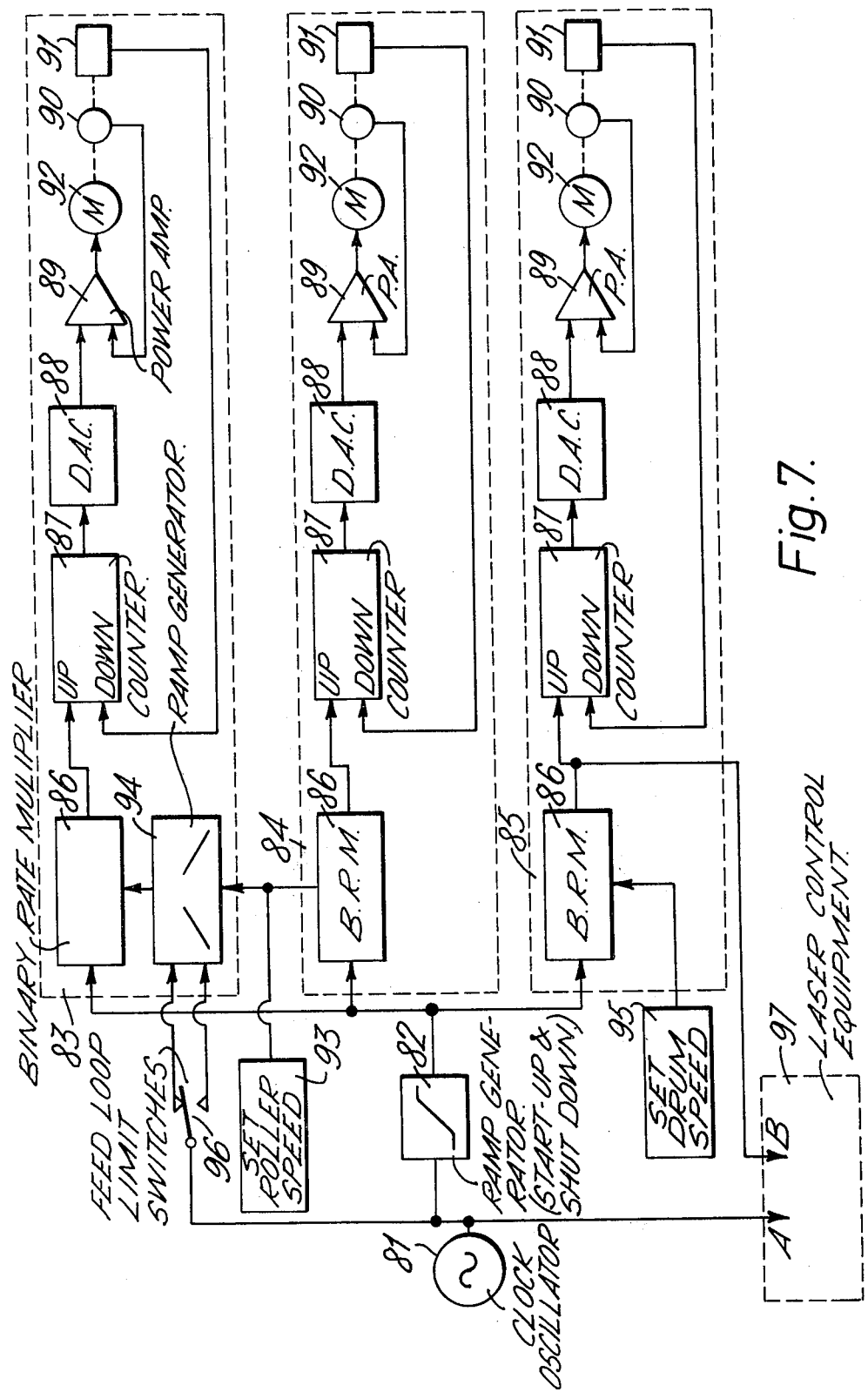

FIG. 5 illustrates a way in which pairs of bags can be formed from a tubular strip of plastics material and FIG. 6 illustrates a way in which single bags can be formed from a tubular strip of plastics material, and FIG. 7 is a block circuit diagram of a servocontrol system incorporated in the embodiment of the invention shown in FIG. 1.

Referring to FIG. 1, a drum 1, formed by a cylindrical hub 2 and two end plates 3, of which only one is shown, has a plurality of dividing members 4 which form a series of spatial intervals, or pockets 5 spaced around the periphery of the hub 2. The dividing members 4 are in the form of radially mounted plates, alternate plates being longer or shorter in the radial sense. The outer edges of the longer of the dividing members 4 have a number of indentations formed in them, while the shorter of the dividing members 4 are capped with a refractory material 6. The drum 1, is rotated by an electric motor which is not shown. A feed station, indicated generally by the numeral 7, includes two pairs of driven feed rollers 8d and 8b and a guide duct 9 described in detail later. The rollers 8a and 8b are driven by electric motors, which also are not shown, and which are linked to a servo control system, to be described later, which operates also upon the motor driving the drum 1 in such a manner that a predetermined, but variable relationship can be maintained between the speed of rotation of the drum 1 and the rate of feed of a web 10 of tubular strip plastics material, to be made into bags. The rollers 8a pull the web 10 of feed stock material from a supply drum, which is not shown, and the rollers 8b feed the web 10 to the drum 1 via a guide duct 9. The strip plastics material is a flattened tube of high-density polythene. The hub of the drum 1 is perforated and a fan 11 and an associated system of ducting 12 enable an inwardly directed air pressure gradient to be maintained. Further round in the direction of rotation of the drum 1 is a laser 13 the beam from which is arranged to be tracked across the ends of the dividing members 4. The beam from the laser 13 is arranged to have a power cross-section such that welding and cutting operations are performed simultaneously.

Further round still is a take off device 15 for removing bags which have been completed. The take-off 15 device is illustrated in FIGS. 1 and 2. Referring to these figures, the take-off device 15 consists of a number of curved spikes 16 which are made from pointed strips 17 of steel and are so positioned as to pass through the indentations in the longer dividing members 4, previously referred to. The strips 17 have webs 18 attached to them which enable them to be attached to the rest of the apparatus. The sides of the strips 17 are sharpened in the neighbourhood of their points, and the leading edges of the webs 18 also are sharpened. Bags carried round to the take-off point are forced onto the spikes 16, and the sharpened edges cut T-shaped slots in the bag material so that the picked-off bags can travel down the spikes 16. The polythene is sufficiently rigid for the bags to stay on the spikes 16. The action of the spikes 16 is facilitated by a rotating paddle 19 driven through gearing from the drive of the drum 1.

The action of the apparatus is as follows:

As each pocket 5 is presented to the feed station 7, a length of the web 10 is fed into it and forms a loop 20. The size of the loop 20, and hence that of the finished bag, is determined by the rate of feed of the web 10 in relation to the angular velocity of the drum 1. The formation of each loop 20 is assisted by means of the inward pressure gradient generated by the fan 11 and the ducting 12. The force exerted on the web 10 is greatest when it has just entered any given pocket 5 and decreases as the pocket 5 is filled. On the other hand the frictional force between the strip 10 and the leading face of the trailing dividing member 4 which forms the pocket 5 increases as the loop 20 is formed. The formation and control of the length of the loop can be aided by means of a throttle valve 21 in the ducting 12. The differential pressure also keeps the loops 20 in position as they are carried round to the position of the laser 13 which welds and cuts the web 10. The laser 13 is operated when the shorter dividing members 4 are positioned beneath its beam position.

The manner in which two bags can be produced simultaneously is illustrated in FIG. 5. Cross-cuts 22 and weld seals 23 are formed on successive shorter dividing members 4 leaving a sealed length 24 of the web 10 folded across the intermediate longer dividing member 4, upon which it is carried round to the position of the take-off spikes 16. These are forced into the folded region of the sealed length 24 of the web 10, and the sealed lengths of the web 10 are picked off with the welded ends all together. When sufficient sealed lengths 24 have been collected they are removed, tack-welded together and provided with perforations near the folds to enable separate bags to be torn off.

Single bags can be made by so displacing the intermediate members 4 with relation to the adjacent dividing members 4 that alternate pockets 5 are wide and narrow, as shown in FIG. 6. The constant rate of feed of the web 10 will result in long loops 20 being formed in the wide pockets 5 and only short loops being formed in the narrow pockets 5, again as shown in FIG. 6. After the sealing and cutting of the lengths 24 of the web 10, they are removed by the take-off spikes 15 as before, and the unwanted material is cut off.

It may be advantageous to provide a perforated plate 61 near the outer end of each narrow pocket 5. The inward flow of air will press the web 10 against the plates even when the web 10 has been cut into sealed lengths 24 and so will help to prevent any tendency for the separated lengths to slip on the intermediate members 4 due to the different weights of material on each side of the intermediate members 4 before they are taken off by the spikes 15.

To achieve high rates of production it is necessary to positively direct the web 10 into successive pockets 5 instead of relying solely on the passage of the dividing members past the feed station 7.

Referring to FIG. 3, the feed duct 9 includes a device for positively directing the web 10 into successive pockets 5 and its action is illustrated in FIGS. 4a to 4d. Attached to one side wall of the duct 9 is a plenum chamber 30. The passage of air from the plenum chamber 30 is controlled by a valve plate 31 and an adjustable gate 32, which forms part of the duct 9. Positioned in the path of air issuing through the valve plate 31 is a twin-lobed rotor 33 which is arranged to be driven at a rate of N/2P where N is the rate of rotation of the drum 1 and P is the number of pockets 5 in the drum 1. The radial length of the lobes 34 of the rotor 33 is such as to provide a slight overlap between their tips and the larger dividing members 4.

The drives between the drum 1 and the rotor 33 are so arranged that the lobes 34 and the dividing members 4 pass one another approximately simultaneously but without actually making contact.

Figure 4:
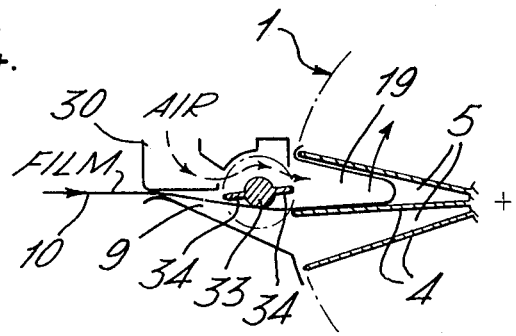
Figure 4:
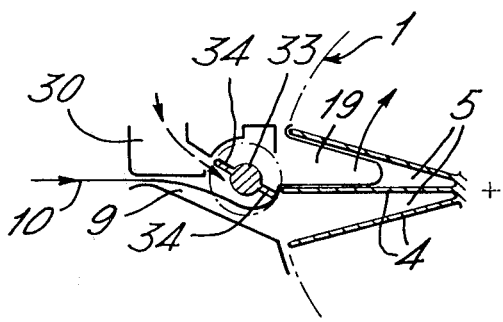
Figure 4:
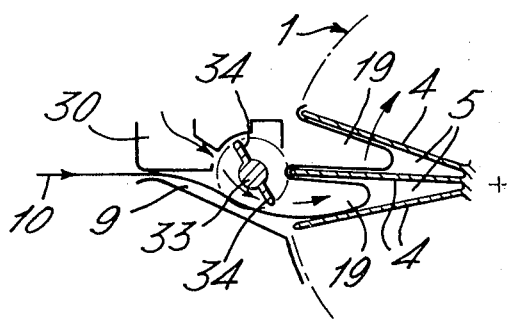
Figure 4:
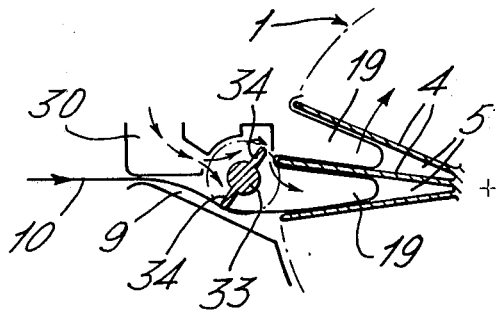

In FIG. 4a the rotor 33 is shown with its lobes 34 approximately parallel to the direction of feed of the feed stock material 10. Air is able to pass from the plenum chamber 30 along one side of the rotor 33 to assist in the formation of a loop 20 of material in one particular pocket 5. FIG. 4b shows the situation when a particular dividing member 4 has just passed a corresponding lobe 34. The slight overlap of the lobe 34 and the dividing member 4 has enabled the lobe 34 to carry the web 10 over the tip of the dividing member 4 and somewhat into the next pocket 5 to assist in the formation of a loop 20. Also, just prior to the mechanical deflection of the web 10 the movement of the rotor 33 cut off the passage of air to the previous pocket 5 and directed it towards the succeeding pocket 5 to assist in forming the incipient loop 20. FIG. 4c shows the situation somewhat later when the loop 20 is partly formed, and FIG. 4d shows the situation later still. Air can now pass on both sides of the rotor 33 into the forming loop 20. And so on.

Alternatively, the web 10 of material can be directed into the pockets 5 by means of suitably positioned and activated jets of air.

If a carbon dioxide laser is used, and the feedstock material is polythene, then it is desirable to take steps to increase the absorption of energy by the polythene. One way of doing this it to use silica as the ceramic material for the tips 6. The silica absorbs readily the $10.6\mu$ radiation from the laser, heats up and passes thermal energy into the polythene.

The laser 13 can be moved physically, but it is preferably to keep the laser 13 stationary and cause the beam of radiation from it to move across the feed stock material 10 by optical means. In either case, due to the motion of the drum 1 it is necessary for the laser beam to have a component of velocity along the length of the strip 10 equal to the linear velocity of the appropriate dividing member 4.

Referring to FIG. 8, the servo control system which maintains the desired relationship between the rotational speed of the drum 1 and the rate of feed of the web 10 consists of a clock pulse generator 81, a ramp generator 82 and three control loops indicated generally by the reference numerals 83, 84 and 85. The loops 83 and 84 control the drives to the feed rollers 8a and 8b and the loop 85 controls the drive to the drum 1.

Each of the control loops 83, 84 and 85 includes a binary rate multiplier 86, a counter 87, a digital-to-analogue converter 88, a power amplifier 89, a tachometer 90, and a shaft position encoder 91. The tachometer 90 and the shaft position encoder 91 are attached to the armature of an electric motor 92 which drives the relevant part of the machine. The control loop 83 which controls the unreel roller 8a, also includes a ramp generator 94. The two loops 83 and 84 are governed by a set speed device 93 for setting the speed of the rollers 8a and 8b in relation to that of the drum 1. The loop 85 is governed by another set speed device 95 for setting the speed of the drum 1.

The system operates as follows: The clock pulse generator 81 produces a sequence of regularly recurring clock pulses. The clock pulses are applied to the ramp generator 82, which varies their apparent frequency during periods of run-up and run-down of the machine to and from its working rate, and thence to the binary rate multiplier 86 of each of the control loops 83, 84 and 85.

In the case of the control loop 83, the clock pulses are applied to the rate multiplier 86 via the ramp generator 94.

The factors by which the clock pulses are multiplied are governed by the set speed devices 93 and 95 under the control of the operator of the machine. It is the relationship between these factors which determines the relationship between the rate of feed of the web 10 and the rate of rotation of the drum 1, and hence the size of the finished bags. In each of the control loops 83, 84 and 85, the pulses from the multiplier 86 are applied to the counter 87 and there compared with pulses derived from the shaft position encoder 91. The resulting difference signal is applied to the digital-to-analogue converter 88 and thence to the power amplifier 89 which drives the motor 92. Further control over the shaft speed of each motor 92 is derived from a tachometer 90 attached to the armature of the motor 92 which produces signals indicative of the shaft speed. The velocity signals also are applied to the amplifier 89.

The clock pulses from the pulse generator 81 also are applied to a separate control system 97 for controlling the operation of the laser 13, and, via two limit switches 96 to the ramp generator 94 which is included in the control loop 83. The purpose of this arrangement is to ensure that a loop of lightly tensioned web material is maintained between the rollers 8a and 8b, thus ensuring that the web 10 is fed to the drum 1 in an unstressed state. The limit switches 96 enable the size of the loop to be controlled.

We claim:

1. A machine for manufacturing bags from a strip of two superimposed layers of plastics material, said machine comprising a carriage, a plurality of dividing members thereon which define a series of spatial intervals, means for moving the carriage so as to present each spatial interval first to a material feed station, then to a work station, and then to a take-off device, said feed station including means for continuously feeding a strip of material to the carriage, means for maintaining a predetermined relationship between the rate of feed of the material and the speed of the carriage, and a feed duct for feeding the strip of material into each spatial interval as that spatial interval is presented to the feed station, the work station including means for forming a welded seam and for cutting the strip material into sealed length at every alternate dividing member as it is presented to the work station, and said take-off device comprising at least one stationary spike pointing in a direction opposite of the direction of movement of the dividing members past the take-off device and disposed so as to pierce the sealed and cut lengths of material where said lengths are folded over the dividing members intermediate the dividing members at which the cutting and sealing operations are carried out, the said intermediate dividing members being relieved to allow the passage of the at least one spike therethrough.

2. A machine according to claim 1 further comprising means for extracting air from the spatial intervals so as to cause the strip of material to adhere to the dividing members and produce tension forces within the strip of material.

3. A machine according to claim 1 wherein the carriage comprises a member arranged for rotation about an axis and the dividing members comprise a plurality of radially extending plates mounted upon the said member parallel to the axis of rotation of the said member.

4. A machine according to claim 1 wherein said at least one spike comprises a strip having a pointed end and sides which are sharpened in the neighborhood of the pointed end and an attachment web for the strip having a sharpened leading edge so that the spike forms a T-shaped slot in the lengths pierced thereby, so said lengths can travel down the spike.

5. A machine according to claim 4 further comprising means for assisting the passage of the cut lengths of strip material along the said at least one spike to a collecting point.

6. A machine according to claim 5 wherein the means for assisting the passage of the cut lengths of material along said at least one spike comprises a paddle wheel for engaging the lengths of material after said lengths have been pierced and for pushing said lengths along the spike, and means for rotating the paddle wheel.

7. A machine according to claim 1 wherein the work station includes means for producing a beam of radiant energy which has a cross-section such that the sealing and cutting operations are performed simultaneously.

8. A machine according to claim 7 wherein the source of the beam of radiant energy comprises a laser.

9. A machine according to claim 8 wherein the dividing members have tips formed of silica.

10. A machine for manufacturing bags from a strip of plastics material, said machine comprising a carriage, a plurality of dividing members thereon which define a series of spatial intervals, means for moving the carriage so as to present each spatial interval first to a material feed station and then to a work station, said feed station including means for continuously feeding a strip of material to the carriage, means for maintaining a predetermined relationship between the rate of feed of the material and the speed of the carriage, a feed duct for feeding the strip of material into each spatial interval as that spatial interval is presented to the feed station, a rotor, having radially extending blades, positioned at the exit end of the feed duct, and means for rotating said rotor, in a direction opposite to the direction of movement of said carriage, in synchronism with the means for moving the carriage such that individual ones of the blades of the rotor are substantially in registration with successive ones of said dividing members so that the strip of material is engaged by a said blade and directed around the outer edge of the dividing member in registration with that blade.

11. A machine according to claim 10 wherein the work station includes means for producing a beam of radiant energy which has a cross-section such that the sealing and cutting operations are performed simultaneously.

12. A machine according to claim 11 wherein the source of the beam of radiant energy comprises a laser.

13. A machine according to claim 12 wherein the dividing members have tips formed of silica.

14. A machine according to claim 13 further comprising a plenum chamber having an air inlet and an air outlet, said air outlet being positioned relative to the rotor so that the blades of the rotor direct air flowing from said outlet onto the strip of material so as to assist the motion of the strip into successive ones of said spatial intervals.

15. A machine according to claim 13 further comprising means for extracting air from the spatial intervals so as to cause the strip of material to adhere to the dividing members and produce tension forces within the strip of material.

16. A machine according to claim 13 wherein the carriage comprises a member arranged for rotation about an axis and the dividing members comprise a plurality of radially extending plates mounted upon the said member parallel to the axis of rotation of the said member.

17. A machine according to claim 13 wherein the strip material is in the form of a tube and the work station includes means for forming a welded seam and for cutting the strip material into sealed lengths at every alternate dividing member.

18. A machine according to claim 17 further comprising a take-off device to which the spatial intervals are successively presented after the work station by movement of the carriage, the take-off device comprising at least one stationary spike pointing in a direction opposite of the direction of movement of the dividing members past the take-off device and disposed so as to pierce the sealed and cut lengths of material where said lengths are folded over the dividing members intermediate the dividing members at which the cutting and sealing operations are carried out, the said intermediate dividing members being relieved to allow the passage of the at least one spike therethrough.

19. A machine according to claim 18 wherein said at least one spike comprises a strip having a pointed end and sides which are sharpened in the neighborhood of the pointed end and an attachment web for the strip having a sharpened leading edge so that the spike forms a T-shaped slot in the lengths pierced thereby, whereby lengths can travel down the spike.

20. A machine according to claim 19 further comprising means for assisting the passage of the cut lengths of strip material along the said at least one spike to a collecting point.

21. A machine according to claim 20 wherein the means for assisting the passage of the cut lengths of material along said at least one spike comprises a paddle wheel for engaging the lengths of material after said lengths have been pierced and for pushing said lengths along the spike, and means for rotating the paddle wheel.

* * * * *